Figure 1:
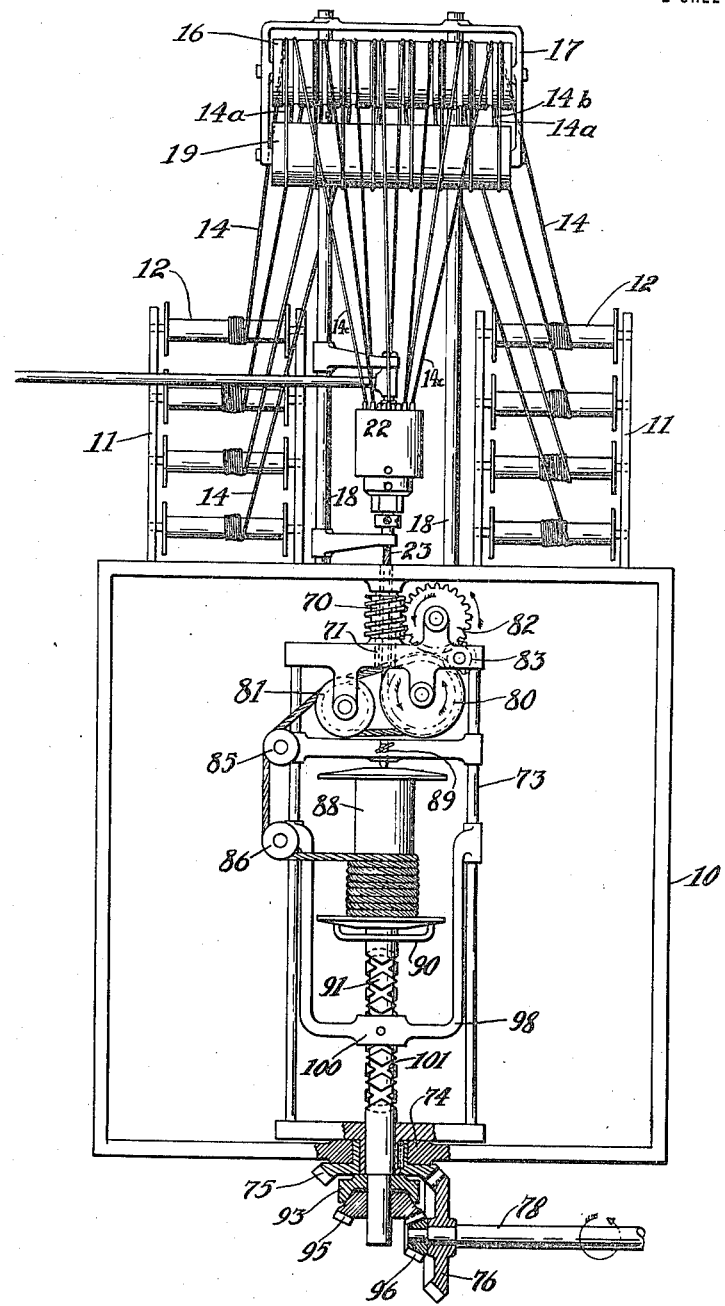

J. D. TEW.
MACHINE FOR MAKING HOLLOW CORD.
APPLICATION FILED APR. 20, 1914.

1,261,317.

Patented Apr. 2, 1918.
2 SHEETS—SHEET 1.

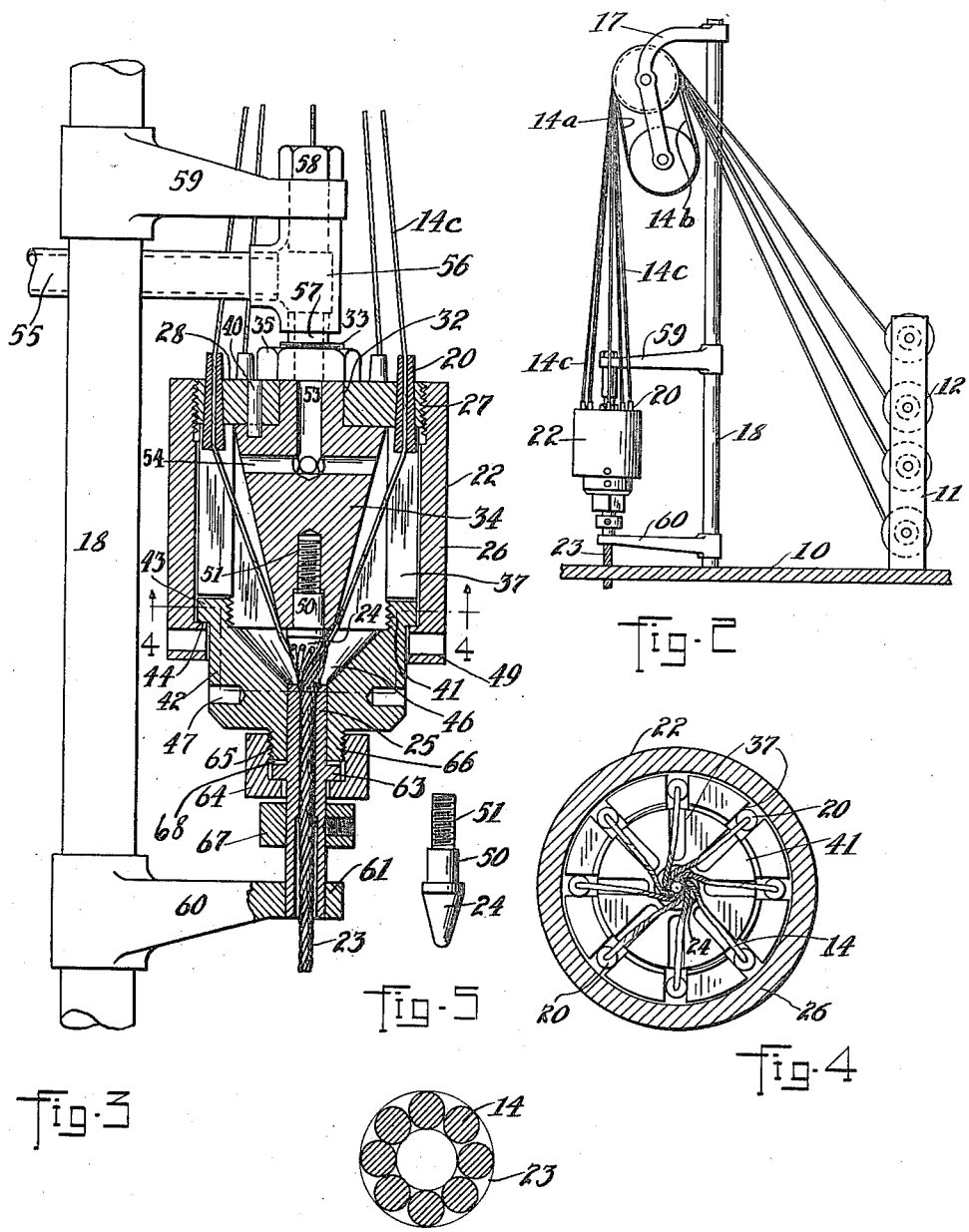

UNITED STATES PATENT OFFICE.

JAMES D. TEW, OF AKRON, OHIO, ASSIGNOR TO THE B. F. GOODRICH COMPANY, OF NEW YORK, N. Y., A CORPORATION OF NEW YORK.

MACHINE FOR MAKING HOLLOW CORD.

1,261,317.

Specification of Letters Patent.

Patented Apr. 2, 1918.

Application filed April 20, 1914. Serial No. 833,249.

*To all whom it may concern:*

Be it known that I, JAMES D. TEW, a citizen of the United States, residing at Akron, in the county of Summit and State of Ohio, have invented a certain new and useful Improvement in Machines for Making Hollow Cord, of which the following is a full, clear, and exact description, reference being had to the accompanying drawings.

My prior application No. 800,337, filed November 11, 1913, shows, describes and claims a hollow, twisted cord impregnated with rubber. Such a cord is very useful in the manufacture fo tire casings, hose, etc. For example, my application No. 833,248 filed simultaneously herewith shows and claims a tire casing built up with such cords.

The present invention is concerned with an apparatus for making such hollow cord from twisted and impregnated strands. The mechanism of the present invention takes impregnated strands produced by any satisfactory method and twists them into a hollow cord, and, as the strands progress through the apparatus, adds rubber solution to them so as to cause them to closely adhere to each other in the completed cord. This not only cements the strands to each other but individually insulates them and prevents them wearing one on the other. Thus, a hollow cord is produced which retains its shape when wound on a spool for storage, but, when desired may be flattened by an ordinary pressure without danger of crushing the strands, to make a cord of oblong cross section, such as explained and claimed in the application first referred to.

My winding apparatus, in the approved form, is shown in the drawings hereof and hereinafter more fully explained.

In the drawings Figure 1 is a general somewhat diagrammatic view, being an elevation of my apparatus: Fig. 2 is a side elevation of the upper portion thereof, showing the means for guiding the strands to the twisting mechanism: Fig. 3 is a vertical central section through the portion of my apparatus in which the cord is actually twisted and showing the means for adding rubber solution to the strands being twisted; Fig. 4 is a horizontal section, being taken substantially on the line 4—4 of Fig. 3; Fig. 5 is a detail of a needle or guide over which the strands are twisted; Fig. 6 is a diagrammatic cross section on an enlarged scale of the finished cord.

Referring to the drawings, 10 indicates a suitable supporting frame having pairs of uprights 11, carrying spools or bobbins 12, from which the strands are drawn to make the tubular cord. Each strand 14, as it comes from its respective spool 12, passes over a guide roller 16, provided with a pair of adjacent annular grooves for each strand, and which is suitably mounted in a frame bracket 17, carried by uprights 18. Each strand is led over the roller 16 in one groove and downwardly as at $14^a$ around a common roller 19 and then upwardly at $14^b$, again over the roller 16, being guided by the groove adjacent the one by which it is first guided over this roller. The strands then lead downwardly as at $14^c$ to guiding bushings or dies 20.

The bushings or dies 20, are mounted in the upper end of a casing 22, hereinafter more fully described, and within the casing the strands lead downwardly and converge about the conical needle or former 24, rigidly mounted in the casing and having its rounded lower end extending slightly into the flaring upper end of a tubular die 25, carried by the casing and acting as a guide for the completed cord 23. The strands are twisted about the conical guide by twisting the cord 23 from beneath and at the same time drawing it downwardly through the die 25.

The twisting of the strands about the needle 24 at the upper end of the tubular die, causes the separate strands to lie against each other in such a manner that they form a tubular cord. Rubber solution with which these strands are treated causes each strand to adhere to its neighbor, which insures the cord retaining its shape during the subsequent passing over pulleys and the winding of the cord onto a suitable bobbin or spool for handling and storage. The mechanism for twisting the cord and drawing it downwardly, may be an adaptation of mechanism heretofore well known in the manufacture of ordinary cord. Such a mechanism is somewhat diagrammatically shown in Fig. 1 and is hereinafter briefly described.

The casing 22 provides a chamber through which the strands are led and in which cement or rubber solution is added to the strands, as they are led through it. This casing comprises a sleeve 26, having internal threads 27, at the upper end, adapted to receive the external threads of a disk 28, which is provided with tapered holes, equally spaced apart adjacent its periphery, for the reception of the bushings 20, which are correspondingly tapered. This taper provides for driving the bushings tightly into place, while allowing ready removal by driving them out, when it is desired to replace them. This disk is provided with a central opening 32, into which is secured a shank 33, of a guide member or filler 34. The upper portion of the shank 33 is threaded and a nut 35 holds the guide member in position. This member is generally cylindrical in form and fits loosely inside the sleeve, substantially filling the same, and is provided with vertical grooves or channels 37, the bottoms of which are preferably slanted so that they converge at their lower ends, allowing the strands to converge about the guide 24, as described. The outer portion of these grooves is wider than the inner portion, to allow the bushings 20 to be placed in position and driven upwardly. When in position, the guide member is held against rotation by means of a pin 40, extending through the disk 28 and into the guide, as shown.

The casing sleeve 26 is closed at its lower end by a die holder 41, having threads cooperating with a male threaded portion 41 on the guide member. This die holder is substantially cylindrical and is provided with an outwardly extending flange 43 engaging an inwardly extending flange 44 on the casing sleeve. The upper end of the die holder is provided with a conical surface 46, converging toward the upper end of the tubular die 25, and forming a space which is normally filled by the rubber solution within the casing. Suitable holes 47 are provided in this member whereby the die holder may be screwed into place with a spanner wrench. Similar holes are provided at 49, in the sleeve 26, for unscrewing it from the threads 27.

As the strands 14 are brought downwardly through the bushings 20, passing through the grooves 37 and converging onto the former needle, as described, they are coated and somewhat saturated with the rubber solution, which is forced into the casing through an axial passage 53, leading to radial passages 54 opening into these grooves. The rubber solution is brought to the grooves through a pipe 55, leading to a T 56, there being a short nipple 57 threaded into suitable threads in the upper end of the shank and into the T. A cap screw 58 extends through a suitable eye in an arm 59, carried by one of the uprights 18, and into the upper portion of this T 56, thereby providing for securing the upper end of the casing. The lower end of the casing is secured by an arm 60, mounted on the upright 18, and having an eye 61 fitting around an extension of the die 25. This die has an intermediate flange 63, fitting into a recess of a flanged nut 64, having its threads 65 engaging a threaded downwardly projecting nipple 66 of the die holder 42, thereby securing the same in position. A removable washer 68 of proper thickness facilitates the longitudinal adjustment of the die 25, the substitution of a thinner washer compensating for wear by allowing the die to be moved upwardly.

The needle 24 is provided with a shank 50 and threaded portion 51, engaging a corresponding cylindrical hole and a threaded hole respectively, in the lower end of the guide member 24.

When it is desired to start new strands through the casing and die, the sleeve 26 is unscrewed and dropped down, leaving full access to the guide member and needle 24. The nut 64 is then unscrewed, which by engaging a collar 67, rigid on the die, moves the same downwardly away from the needle. The bushings or dies 20, are then removed and the strands passed through the holes in which they fit, and then through the bushings, which may be then replaced. The strands are now passed through the channels in the guide member and through the die 25. This die is then brought upwardly into place, by the nut 64, and the sleeve 26 then replaced, thus making the casing thoroughly tight. Cement may now be turned into the casing through the pipe 55, and the mechanism for twisting started. The object of constructing the guide member to substantially fill the casing and providing channels for the separate strands, is that it requires much less cement in the impregnating chamber than as if this chamber were entirely filled with cement. This is desirable as I have found that in practice excess cement makes it difficult to clean this casing when it becomes necessary to disassemble the same to thread the dies with new strands.

As the twisted cord descends from the tubular guide 25, it passes through an opening in the upper portion of the frame 10, and through another tubular member carried by the frame and on which is rigidly mounted a threaded worm 70. This tubular member extends below the worm at 71, forming a bearing which guides the upper end of a rotatable rectangular frame 73, resting at its lower end on a suitable boss at 74. At its lower end, the frame carries a bevel gear 75, which is driven by a bevel gear 76 on the end of a suitable drive shaft 78. The frame 73 carries a pulley 80 having a grooved surface and the cord comes through the tubular member carrying the worm and onto this grooved pulley, passes once around the same and over a grooved pulley 81, and then back over the pulley 80, then over the pulley 81 again, over pulleys 85 and 86 and onto a bobbin 88. The stationary worm 70 is engaged by a worm wheel 82, carried by the frame, which transmits motion through a gear 83, meshing with gear teeth rigid with the pulley 80, thereby rotating this pulley 80 to draw the cord downwardly as the frame 73 is rotated. The passing of the cord twice around the pulley 80, causes the same to frictionally grip this pulley, which provides for drawing this cord downwardly.

The bobbin 88 on which the cord is to be wound, has its upper end engaging a pivot center 89, and the lower end is supported on a fork 90, on the upper end of a shaft 91. The pivot center is held by a thumb screw which may be loosened, allowing the center to be moved upwardly when it is desired to remove the bobbin. The shaft 91 passes axially through the gear 75, and is adapted to rotate independently of the gear and the frame. At the lower end of the shaft is carried a friction clutch member 93, rigid on the shaft, through which motion may be transmitted from a bevel gear 95 loosely carried by the shaft 91. The bevel gear 95 is driven by a bevel gear 96 on the end of the shaft 78. A yoke-shaped frame 98 is slidably mounted on the shaft 91 and carries the pulley 86. This frame has in its intermediate sleeve 100, a co-acting element adapted to engage the right-and-left-hand threads 101 on the shaft 91 and give the frame a longitudinal motion, according to the well known practice. This relative motion of the frame guides the cord evenly to the bobbin 88.

As the driving shaft 78 rotates, the bevel gear wheels 76 and 96 transmit their motion to the respective gear wheels 93 and 95, but the gear ratios are such that the wheel 75 is turned much faster than the wheel 95. The rotation of the frame 73 by the gear 75, twists the cord up to the needle 24, where the strands are twisted into the hollow or tubular cord, and at the same time cause the rotation of the grooved pulley 80 in the direction of the arrow, as heretofore described, thereby drawing the cord 23 downwardly. The amount of the twist is determined by the peripheral speed of the pulley 80 relatively to the rate of rotation of the frame 73.

It will be noted that I have provided a device in which the strands 14 of the cord 23 are thoroughly treated with the rubber solution by passing through the casing, this solution being forced into the casing so that the grooves, through which the cords are guided and the conical space about the needle, are entirely filled with the solution under heavy pressure.

By providing the grooved roller 16, and the plain roller 19, over which the strands are led before bringing them to the dies 20, I insure each of these cords being under the same tension, as the friction of these cords passing over these rollers is sufficient to prevent them slipping thereon, and the cords all passing over the same rollers, which are of exactly the same diameter throughout, necessarily insures this equal tension. Suitable brakes, not shown, may be used on the spools 12, preferably bearing directly on the outer layer of the strands to provide a suitable tension, keeping the cords taut as they are led up to the roller 16.

It will be seen that I have devised an apparatus by which a cord may be conveniently and rapidly formed from a plurality of strands, wound or twisted side by side so as to make the cord tubular or hollow in its completed form. Such a cord is shown diagrammatically in Fig. 6, the strands 14 lying side by side against each other in a tubular form.

Having thus described my invention, what I claim is:

1. In a machine for making hollow cord, the combination of means for supplying a plurality of strands, a casing, guides in said casing for the strands, a former within said casing, and means to draw the strands through said casing and twist them around said former so that they will lie side by side forming a cord with a hollow center, and means for forcing liquid into said casing under heavy pressure.

2. In a machine for making hollow cord, the combination of means for supplying a plurality of strands, removable bushings for guiding the strands, a former, means to draw the strands from their supplying means and wind them side by side over said former, and a die for the hollow cord thus formed.

3. In a machine for making hollow cord, the combination of means for supplying a plurality of strands, a casing, removable guides for the strands carried by said casing, a former within said casing, means to draw the strands from their supplying means and wind them side by side over said former, a die for the hollow cord thus formed, and means for forcing cement into the casing.

4. In an apparatus for making hollow cord, the combination with means for supplying a plurality of strands, a casing and guides in said casing for each of said strands, a former within the casing, means for drawing the strands through said guides and twisting them about said former to make a cord with a hollow center, a guide for the cord carried by the bottom of the casing, and means for partially filling the casing to reduce the contents thereof.

5. In an apparatus for making hollow cord, the combination of a casing, means for supplying a plurality of strands to said casing, dies for the strands removably carried by the casing, a cone-shaped former within the casing, a die in axial alinement with said former having a flaring upper end, means for drawing the strands through the first mentioned dies, twisting them around said former to make a hollow cord and drawing said hollow cord through said last named die, said casing being adapted to be dis-assembled so that fresh strands may be started through the same, and means for supplying an impregnating liquid to said casing.

6. In an apparatus for making hollow cord, the combination with a plurality of spools for the separate strands, of a plurality of guides spaced about an axis, a former arranged on said axis adjacent the guides, means for drawing the strands through the guides and twisting them into a hollow cord about said former, a roller over which all of the strands pass and with which they have a frictional engagement causing the strands to have an equal tension as they are drawn through the guides.

7. In a machine for making hollow cord, the combination of a plurality of spools for the separate strands, a plurality of guides for the strands, means for drawing the cords through said guides and twisting them into a cord, a former over which the strands are twisted adapted to make a hollow center within the cord, a pair of rollers over which each of the strands pass, one of said rollers having guiding grooves whereby the frictional engagement of the strands with said rollers causes them to come to the guides under equal tension.

8. In a machine for making hollow cord, the combination of means for supplying a plurality of strands, a disk having a plurality of tapered openings therethrough spaced about its center, bushings adapted to fit said openings to guide the separate strands, a former, means for drawing the strands through said bushings around the former to make a hollow cord, a substantially cylindrical plug carried by the disk having a shank extending through the same and secured thereto, grooves in said plug for the individual strands, radial passages leading to each of said grooves, and a passage communicating with each of said radial passages.

9. In a machine for making hollow cord, the combination of means for supplying a plurality of strands, a disk having a threaded periphery, guides carried by said disk for the individual strands, a former carried by said disk, means for drawing the strands through said guides and around said former to make a hollow cord, a die for the hollow cord, a die holder in which the same is mounted having a flange, and a sleeve having a flange engaging the flange on the die holder and having a threaded engagement with said disk.

10. In a machine for making hollow cord, the combination of means for supplying a plurality of strands, a casing having guides for the strands, a former carried by the casing, means for drawing the strands through said guides and twisting them around said former to make a hollow cord, a die holder forming the bottom of the casing, a tubular die in said holder in axial alinement with the former, said die having a flange, a nut engaging said flange and having a threaded engagement with the die holder for holding the die in place and permitting the longitudinal adjustment thereof.

11. In a machine for making hollow cord, the combination with a means for supplying a plurality of strands, of a casing having guides for each strand, a former carried by the casing, means for drawing the strands through the guides and twisting them around said former to make a hollow cord, a die holder forming the bottom of the casing, a tubular die carried thereby, a sleeve forming the sides of the casing, and means for removing said sleeve to provide for threading new strands through said guides and die.

12. In a machine for making hollow cord, the combination of means for supplying a plurality of strands, a passage in which the said strands are subjected to cement under pressure, dies at one end of said passage which closely fit the strands to prevent the passage of cement, a former around which the strands are twisted, a die through which the twisted cord passes, the said former and die fitting the cords to prevent the free passage of cement, and means for twisting the cord about the former.

In testimony whereof, I hereunto affix my signature in the presence of two witnesses.

JAMES D. TEW.

Witnesses:
FRANCIS B. CONVERSE,
ALBERT H. BATES.